(12) United States Patent
Huke et al.

(10) Patent No.: US 12,198,496 B2
(45) Date of Patent: *Jan. 14, 2025

(54) AI WAGER ODDS ADJUSTER

(71) Applicant: AdrenalineIP, Washington, DC (US)

(72) Inventors: Casey Alexander Huke, Washington, DC (US); John Cronin, Jericho, VT (US); Joseph Bodkin, Quincy, MA (US); Harrison Grant, Anaheim, CA (US)

(73) Assignee: AdrenalineIP, Washington, DC (US)

( * ) Notice: Subject to any disclaimer, the term of this patent is extended or adjusted under 35 U.S.C. 154(b) by 372 days.

This patent is subject to a terminal disclaimer.

(21) Appl. No.: 17/683,793

(22) Filed: Mar. 1, 2022

(65) Prior Publication Data

US 2022/0189238 A1 Jun. 16, 2022

Related U.S. Application Data

(63) Continuation-in-part of application No. 17/400,503, filed on Aug. 12, 2021, which is a continuation-in-part of application No. 17/081,185, filed on Oct. 27, 2020, now Pat. No. 11,094,171.

(60) Provisional application No. 62/958,808, filed on Jan. 9, 2020.

(51) Int. Cl.
*G07F 17/32* (2006.01)
*G06Q 50/34* (2012.01)

(52) U.S. Cl.
CPC ........... *G07F 17/323* (2013.01); *G06Q 50/34* (2013.01); *G07F 17/3239* (2013.01); *G07F 17/3241* (2013.01); *G07F 17/3288* (2013.01)

(58) Field of Classification Search
CPC .............. G07F 17/323; G07F 17/3239; G07F 17/3288; G07F 17/3227; G07F 17/3237; G06Q 50/34; G06Q 40/02; G06N 20/00
USPC .......................................... 463/25
See application file for complete search history.

(56) References Cited

U.S. PATENT DOCUMENTS

| 10,535,230 B2* | 1/2020 | Lutnick ............ G07F 17/34 |
| 2006/0094506 A1 | 5/2006 | Tarter et al. |
| 2011/0014974 A1 | 1/2011 | Torf |
| 2012/0214575 A1 | 8/2012 | Amaitis et al. |

(Continued)

FOREIGN PATENT DOCUMENTS

| BR | PI0012300 A2 | 3/2002 |
| BR | PI0905903 A2 | 6/2015 |

(Continued)

OTHER PUBLICATIONS

Notification of Transmittal of the International Search Report and the Written Opinion of the International Searching Authority issued on Mar. 24, 2021, in connection with corresponding international Application No. PCT/US2021/012162 (9 pp.).

(Continued)

*Primary Examiner* — Pierre E Elisca
(74) *Attorney, Agent, or Firm* — Maier & Maier, PLLC (57) ABSTRACT

A method and system for using artificial intelligence (AI) to assess and adjust the betting odds for live game wagers before they are presented to users based correlations between various parameters and user betting behavior, and to adjust the betting odds while the betting window is open based on how users are currently betting compared to expected user betting behavior.

14 Claims, 5 Drawing Sheets

Content - High Level Diagram (56) References Cited

U.S. PATENT DOCUMENTS

| | | | |
|---|---|---|---|
| 2014/0370958 A1* | 12/2014 | Lutnick | G07F 17/32 |
| | | | 463/25 |
| 2018/0204417 A1 | 7/2018 | Triplett | |
| 2019/0122482 A1 | 4/2019 | Amaitis et al. | |
| 2019/0180558 A1 | 6/2019 | Merati | |
| 2019/0236892 A1 | 8/2019 | English | |
| 2020/0160666 A1* | 5/2020 | Lutnick | G07F 17/34 |
| 2020/0357236 A1* | 11/2020 | Danielson | G07F 17/3288 |
| 2021/0342935 A1 | 11/2021 | Amaitis et al. | |
| 2022/0060446 A1 | 2/2022 | Dalvi et al. | |

FOREIGN PATENT DOCUMENTS

| | | | |
|---|---|---|---|
| CN | 104903917 A | 9/2015 | |
| CN | 106659927 A | 5/2017 | |
| CN | 107548318 A | 1/2018 | |

OTHER PUBLICATIONS

International Search Report and Written Opinion issued on Jul. 28, 2023, in corresponding International Application No. PCT/US2023/63439, 7 pages.

Office Action issued on Mar. 28, 2024 in corresponding Chinese Application No. 202180020378.6, 20 pages.

Office Action issued on Oct. 11, 2024, in corresponding Chinese Application No. 202180020378.6, 19 pages.

Office Action issued on Sep. 11, 2024, in corresponding Brazilian Application No. BR112022013709-5, 16 pages.

* cited by examiner

Fig.1 Content - High Level Diagram

Fig.2 Base Module

Fig.3 Wager Module

Fig.4 Wager Adjustment Module

| Wager ID | Situational Data | | | | | Parameters | | |
|---|---|---|---|---|---|---|---|---|
| | | | To Gain | | | | Total Amount Paid Out | |
| 100065 | Patriots | 2nd | 1st | 10 | Pass | 259 | $10,564 | $0 | $10,564 | Boston, MA |
| 100090 | Patriots | 2nd | 1st | 10 | Pass | 138 | $5,890 | $5,890 | ($5,890) | Boston, MA |
| 100187 | Patriots | 2nd | 1st | 10 | Pass | 176 | $7,895 | $7,895 | ($7,895) | Boston, MA |
| 100265 | Patriots | 2nd | 1st | 10 | Pass | 154 | $6,875 | $0 | $6,875 | Boston, MA |
| 100359 | Patriots | 2nd | 1st | 10 | Pass | 215 | $8,900 | $8,900 | ($8,900) | Boston, MA |
| ... | ... | ... | ... | ... | ... | ... | ... | ... | ... | ... |

Fig.5 Historic Bet Database

| Number of Wagers | Amount Wagered | Wager Adjustment |
|---|---|---|
| 200 | $7,500 | 5% decrease |
| 275 | $12,500 | 10% decrease |
| 350 | $15,000 | 15% decrease |
| 400 | $20,000 | 20% decrease |
| - | - | - |
| - | - | - |
| - | - | - |

Fig.6 Threshold Database

| Wager ID | Team | Quarter | Down | To Gain | Wager | Odds | Current Number of Wagers | Current Amount Wagered |
|---|---|---|---|---|---|---|---|---|
| 123654 | Patriots | 2nd | 1st | 10 | Pass | -105 | 201 | $5,500 |
| 123655 | Patriots | 2nd | 1st | 10 | Run | -115 | 158 | $7,550 |
| 123656 | Patriots | 2nd | 1st | 10 | Over 5 yards gained | -110 | 50 | $1,500 |
| 123657 | Patriots | 2nd | 1st | 10 | Under 5 yards gained | -105 | 25 | $875 |
| - | - | - | - | - | - | - | - | - |
| - | - | - | - | - | - | - | - | - |
| - | - | - | - | - | - | - | - | - |

Fig.7 Bet Database

| Wager ID | Wager | First Extracted Parameter | Second Extracted Parameter |
|---|---|---|---|
| 123654 | Pass | Number of Wagers 200 | Total Amount of Wagers $7,500 |
| 123655 | Run | Number of Wagers 200 | Total Amount of Wagers $7,500 |
| - | - | - | - |
| - | - | - | - |

Fig.8 Wager Adjustment Database

Fig.9A Example of Wager Module

Fig.9B Example of Wager Module

AI WAGER ODDS ADJUSTER

CROSS-REFERENCE TO RELATED APPLICATIONS

The present patent application claims benefit and priority to U.S. patent application Ser. No. 17/400,503 filed on Aug. 12, 2021, U.S. patent application Ser. No. 17/081,185 filed on Oct. 27, 2020 and U.S. Provisional Patent Application No. 62/958,808 filed on Jan. 9, 2020 which is hereby incorporated by reference into the present disclosure.

FIELD OF THE DISCLOSURE

The embodiments are generally related to sports wagering and artificial intelligence.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

When odds are calculated for a wager objective data and statistics are used so that the payout is proportional to the actual chances of the outcome. A problem is that people do not usually place wagers based on objective data, which can result in largely one sided bets that could result in a loss for the house. Another problem is that when demand one side of a wager greatly exceeds the demand expected based on the odds, the house misses out on profit it could have made by offering lower odds. Yet another problem is that errors in the original odds calculation could be exploited by clever users if the odds aren't subsequently adjusted.

SUMMARY

Embodiments include methods, systems, and apparatuses for using artificial intelligence to adjust wagering odds for a live event in real time. On embodiment includes a method of adjusting wager odds, including filtering a historic database to match a current wager, selecting a common parameter within historic data in the historic database, performing correlations for the selected parameter against other parameters within the historic database, determining if there is correlated data and the correlated data exceeds a first threshold, extracting data points from the correlated data that exceeds the first threshold, comparing the extracted data points to one or more predetermined second thresholds, and adjusting a current wager if the extracted data exceeds at least one of the one or more second thresholds.

Another embodiment includes a computer implemented method for providing odds in a game program using game information, including executing on a processor the steps of: displaying data related to a live sporting event in real time; displaying one or more wagers related to real time wagering in the live sporting event; displaying at least one or more factors related to odds adjustment for the one or more wagers; and displaying one or more adjusted odds for the one or more wagers based on the one or more factors.

BRIEF DESCRIPTIONS OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "bet" or "wager". A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, or perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are services that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, by creating and delivering actionable insights on performance to help customers to manage the sports gaming. Business Applications can be integrated into the embodiments in a variety of manners.

State based integration allows for a given sports gambling game to be modified by states in the United States or other countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

Figure 1:
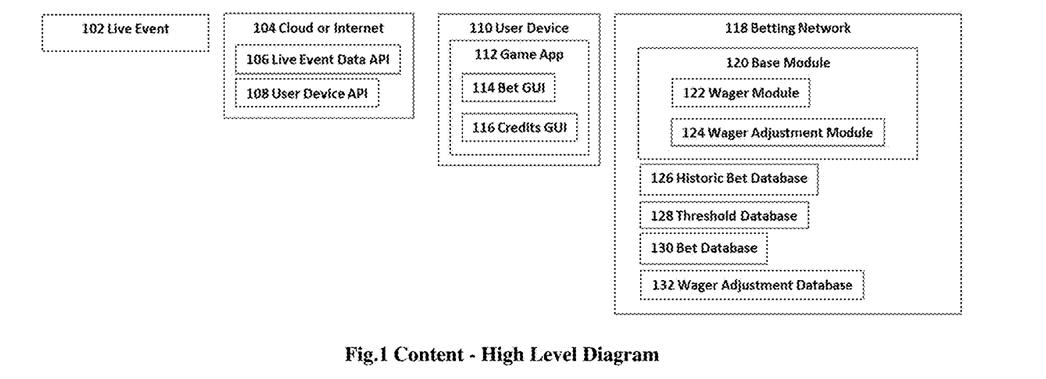
FIG. 1 illustrates an artificial intelligence based live game wager adjuster, according to an embodiment.

This is a system for an artificial intelligence based live game wager system. This system includes a live event 102, for example a sporting event such as a football game, basketball game, baseball game, hockey game, tennis match, golf tournament, etc. A cloud 104 or communication network which may be a wired and/or a wireless network may also be included. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable system resources and higher-level services that can be rapidly provisioned with minimal management effort, often over Internet and relies on sharing of resources to achieve coherence and economies of scale, like a public utility, while third-party clouds enable organizations to focus on their core businesses instead of expending resources on computer infrastructure and maintenance. A live event data API 106, or application program interface, for delivering data from the live event to the betting network 122, may also be included. A user device API 108, or application program interface, for delivering data between the betting network and the user device, may also be included. A user device 110 for connecting to the cloud or Internet and running the game app 112, may also be included. A game app 112 that displays the odds for the next action of the live game, allows the user to place a bet, and displays the user's credits, may also be included. A bet GUI 114, or guided user interface, that displays the possible betting options and odds for each betting option, the odds determine the ratio of credits bet to credits returned if the bet was correct. The interface(s) may either accept inputs from users or provide outputs to the users or may perform both the actions. In one case, a user can interact with the interface(s) using one or more user-interactive objects and devices. The user-interactive objects and devices may comprise user input buttons, switches, knobs, levers, keys, trackballs, touchpads, cameras, microphones, motion sensors, heat sensors, inertial sensors, touch sensors, or a combination of the above. Further, the interface(s) may either be implemented as a Command Line Interface (CLI), a Graphical User Interface (GUI), a voice interface, or a web-based user-interface, may also be included. A credits GUI 116, or guided user interface, that display's the user's current amount of credits in the credit database, winning bets may increase the user's amount of credits while losing bets may decrease the user's amount of credits, credits may be tied to a real money value, may also be included. A betting network 118 which provides an Artificial intelligence based software module that finds correlations from the historic bet database 126 in order to determine if the odds for the current wagers in the bet database need to be adjusted, may also be included. A base module 120 which initiates the wager module and then initiates the wager adjustment module and sends an updated bet database to the user device, may also be included. A wager module 122 which uses the situational data from the historic bet database 126 on previous wagers with the same situational data and performs correlations on the similar wagers in order to determine if there is a correlation from the historic data in order to extract and store the most re-occurring data point in order to update the odds in the bet database, may also be included. A wager adjustment module 124 which uses the most re-occurring data points that were extracted via the wager module and stored in the wager adjustment database and compares them to the threshold database in order to determine if the odds in the bet database should be updated based on the wager adjustments in the threshold database, may also be included. A historic bet database 130 which stores all the historic bets previously placed by users, may also be included. A threshold database which is used to determine the appropriate adjustment in the wager odds by using the extracted most re-occurring data points and if one of the two data points exceeds the threshold database then the wager adjustment in the threshold database is used to update the odds in the bet database, may also be included. A bet database which contains the current bets that users can place a wager on, may also be included. A wager adjustment database which stores the most re-occurring data points extracted from the wager module along with the wager ID and wager in order to be compared with the threshold database in the wager adjustment module to determine if the odds in the bet database should be adjusted, may also be included.

Figure 2:
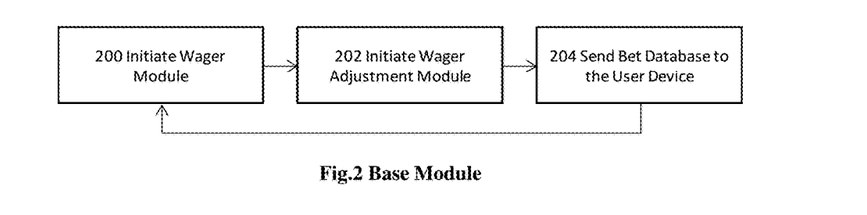
FIG. 2 illustrates a base module, according to an embodiment.

Functioning of the base module will now be explained with reference to FIG. 2. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

This figure displays the base module. The process begins with the base module initiating the wager module, at step 200. Then the base module initiates the wager adjustment module, at step 202. Once the bet database has been updated, or not, via the wager module and wager adjustment module the base module sends the bet database to the user device, at step 204.

Figure 3:
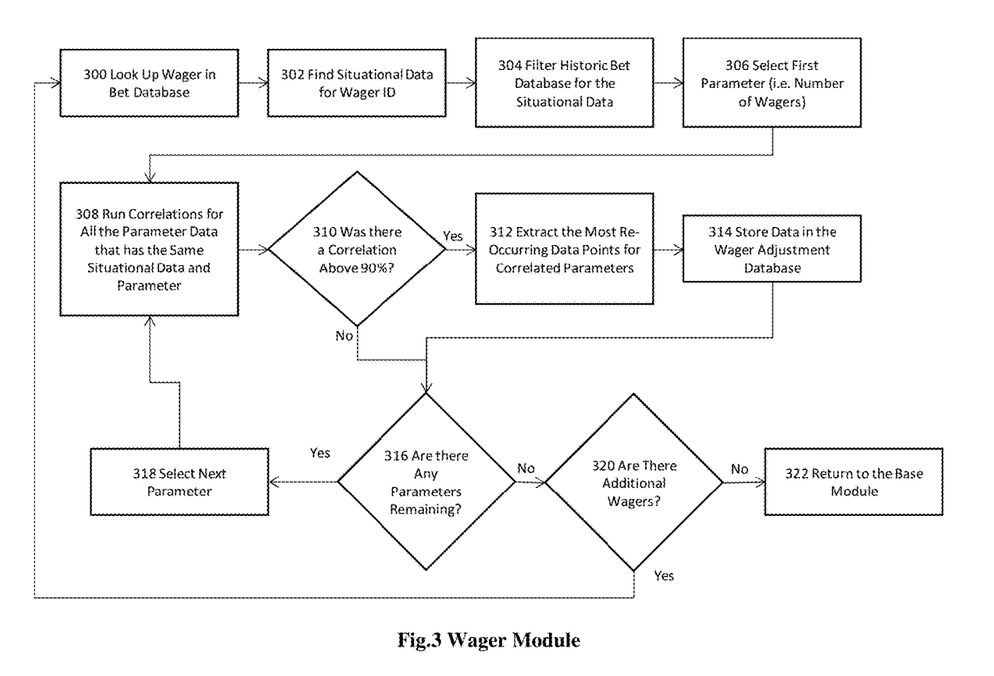
FIG. 3 illustrates a wager module, according to an embodiment.

Functioning of the wager module will now be explained with reference to FIG. 3. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

This figure displays the wager module. The process begins with the wager module looking up the current wager in the bet database, at step 300. Then the wager module finds the situational data for the wager ID, which may be the team, the quarter or time of the event, the down, the distance to gain, etc., at step 302. The historic bet database is filtered on the situational data for the wager ID in order to find all the other previous wagers that have the same situational data, at step 304. The first parameter in the historic bet database, for example the number of wagers placed, at step 306. The wager module then performs correlations for all the other parameter data that has the same situational data and first parameter, at step 308. It is then determined if there was a correlation above a predetermined threshold, for example, 90%, at step 310. If there was a correlation above the predetermined threshold then the most re-occurring data point. For example, in FIG. 9B, the most re-occurring data point for the correlation of number of wagers against the total amount wagered would be 200 wagers and $7,500 wagered. These two data points along with the wager ID from the bet database would be stored in the wager adjustment database, at step 312. Then the extracted data points are stored in the adjustment database, at step 314. If it was determined there was no correlation above the predetermined threshold, then the wager module determines if there are any parameters remaining, at step 316. If there are parameters remaining, the next parameter is selected and the process returns to step 308, at step 318. If it is determined there are no parameters remaining, it is then determined if there are any additional wagers in the bet database. If there are additional wagers, the process returns to step 300, at step 320. If there are no additional wagers the process returns to the base module, at step 322.

Figure 4:
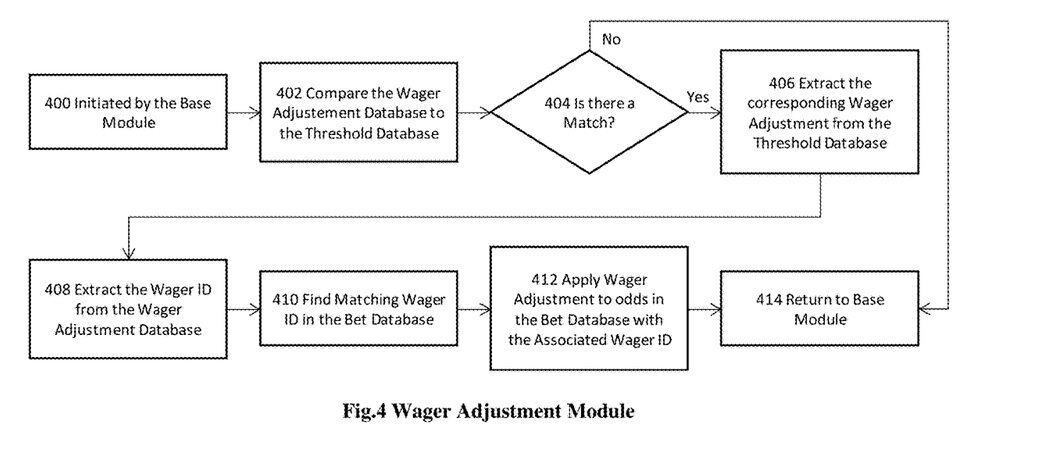
FIG. 4 illustrates a wager adjustment module, according to an embodiment.

Functioning of the wager adjustment module will now be explained with reference to FIG. 4. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

This figure displays the wager adjustment module. The process begins with the wager adjustment module being initiated by the base module, at step 400. The wager adjustment module compares the wager adjustment database to the threshold database, at step 402. It is determined if there is a match, for example the wager adjustment module has the most re-occurring data point which is 200 wagers and $7,500 wagered which when compared to the threshold results in the odds being decreased by 5%, at step 404. If there is a match then the corresponding wager adjustment from the threshold database, for example a 5% decrease, is extracted, at step 406. The wager ID from the wager adjustment module is also extracted in order to assist in adjusting the odds in the bet database, at step 408. The extracted wager ID is matched with the corresponding wager ID in the bet database, at step 410. The odds in the bet database are adjusted by the extracted wager adjustment, for example the 5% decrease from the threshold database. If the odds in the bet database are −105 and the wager adjustment is a 5% decrease then the odds in the bet database are adjusted and the new odds are −110, at step 412. If there is no match from the wager adjustment database to the threshold database then the process returns to the base module, at step 414.

Figure 5:
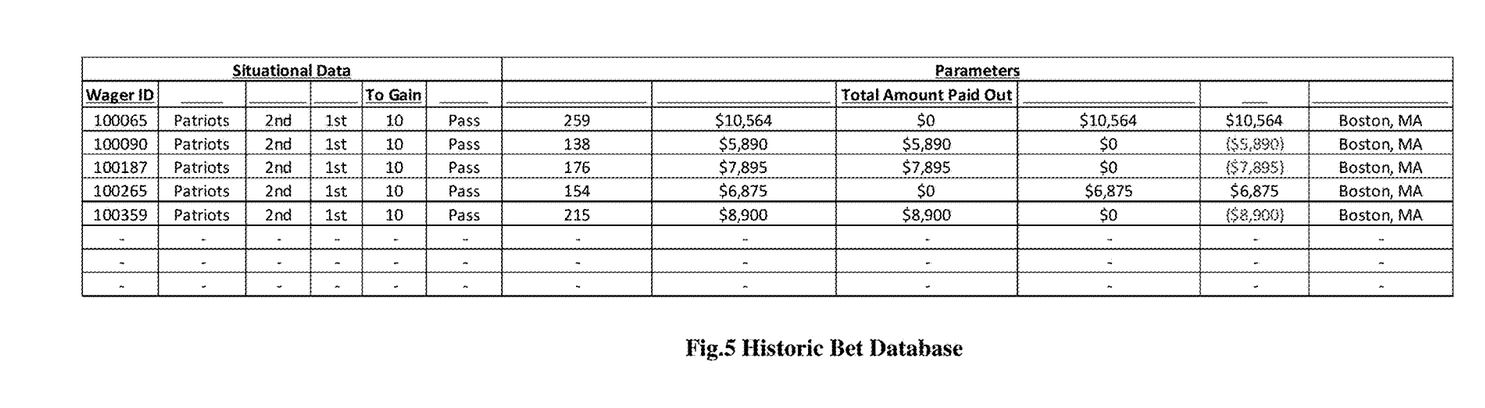
FIG. 5 illustrates a historic bet database, according to an embodiment.

Functioning of the historic bet database will now be explained with reference to FIG. 5. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

This figure displays the historic bet database which contains all the wager data from previously placed wagers by users. The database may contain situational data such as the wager ID, the team the wager was for, the quarter or time period of the game or event, the down, the distance to gain, and what the wager was for. The historic bet database also contains parameter data for each of the wagers such as the number of wagers which is the number of individual wagers placed by users on the wager, the total amount wagered on the bet, the total amount paid out to the users from the wager, behavior, including the total amount retained by the network, the profit and/or loss from the wager from the standpoint of the betting network, and the location of the wager which is where the individual user was located when the placed the wager. The database as currently shown is filtered for the situational data and the parameter of the location in order to determine if there are any correlations between the parameter data while filtered on the location parameter to see if odds should be adjusted for users within the Boston area when placing a wager on the New England Patriots. In some embodiments, the situational data may be user specific bet history or bets previous made by a specific user or group of users. In some embodiments, the situational data may be bet data collected from various sportsbooks by region, nation, or a combination of specific regions or nations. In some embodiments, the situational data may be a collection of wager odds from third parties, for example casinos, sportsbooks, sports apps or websites, etc. In some embodiments, the situational data may be collected from an odds marketplace which is a collection of various wager odds from third parties. In some embodiments, the situational data may be filtered on user preferences, for example certain sportsbooks the user uses or specific regions of the country or specific nations that may provide different wager odds, element 500.

Figure 6:
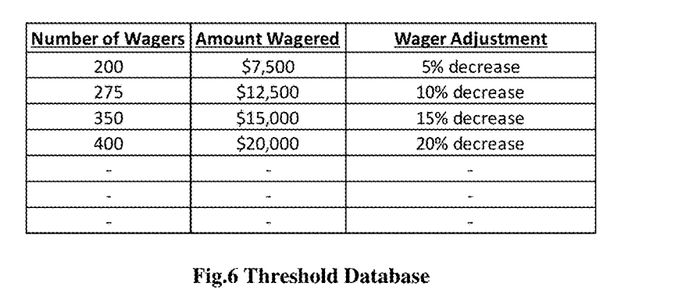
FIG. 6 illustrates a threshold database, according to an embodiment.

Functioning of the threshold database will now be explained with reference to FIG. 6. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

This figure displays the threshold database which contains the various predetermined thresholds to be compared with the extracted data points from the wager module in order to determine if the odds in the bet database should be adjusted to account for user trends within placing the wagers. The database may contain the number of wagers, the amount wagered and the associated wager adjustment which is used to adjust the odds in the bet database, element 600.

Figure 7:
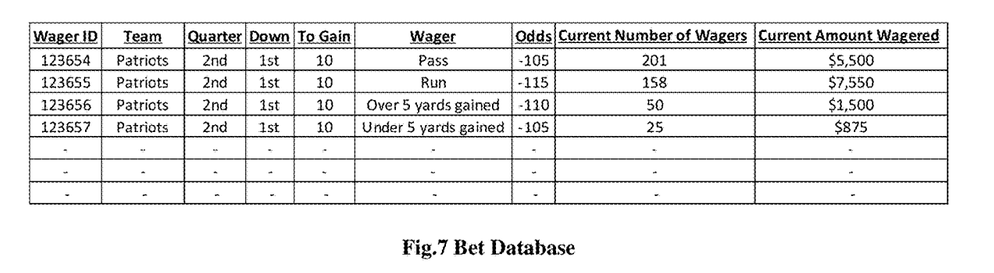
FIG. 7 illustrates a bet database, according to an embodiment.

Functioning of the bet database will now be explained with reference to FIG. 7. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The bet database contains a list of all current wagers available to the users of the betting network. The database may contain the wager ID, the team, the quarter, the down, the distance to gain, the wager the odds, the current number of wagers and the current amount wagered, element 700.

Figure 8:
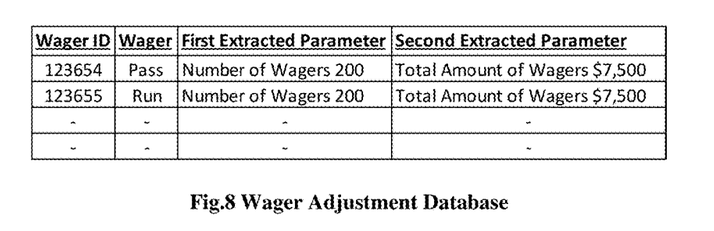
FIG. 8 illustrates a wager adjustment database, according to an embodiment.

Functioning of the wager adjustment database will now be explained with reference to FIG. 8. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

This figure displays the wager adjustment database which stores the most re-occurring data points extracted from the wager module along with the wager ID and wager in order to be compared with the threshold database in the wager adjustment module to determine if the odds in the bet database should be adjusted. The database may contain the wager ID, the wager, and the extracted first parameter or first extracted data point shown on the x-axis in FIG. 9B, and the second extracted parameter or second extracted data point shown on the y-axis in FIG. 9B, element 800.

Figure 9A:
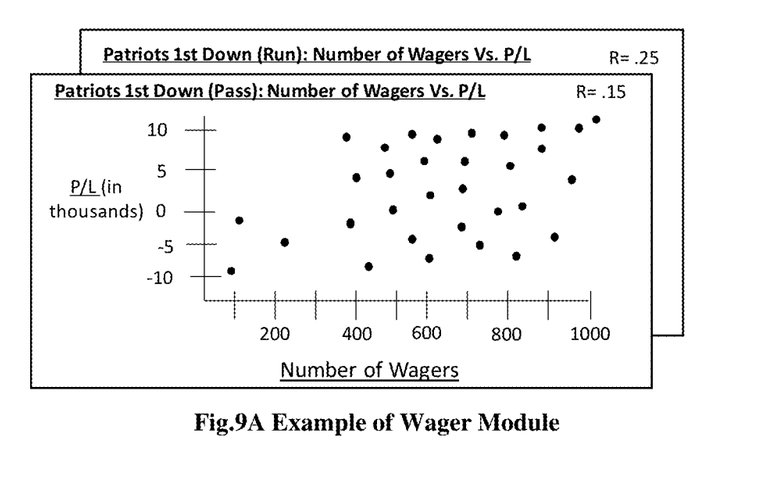
FIG. 9A illustrates an example of a wager module, according to an embodiment.
Figure 9B:
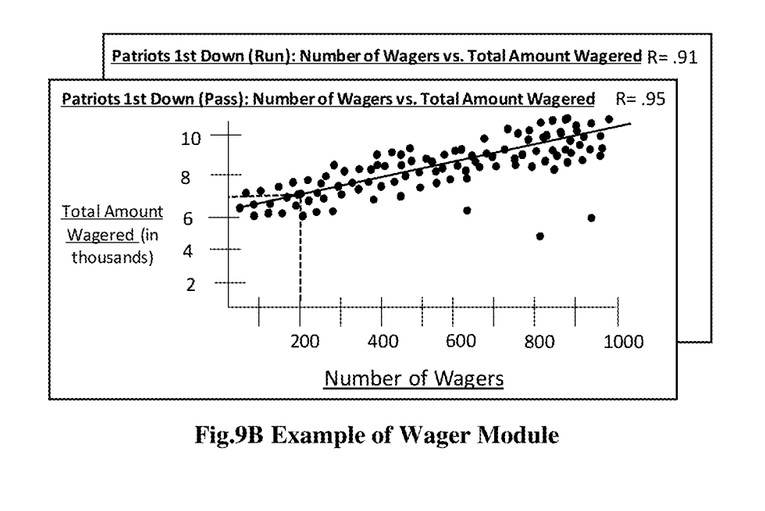
FIG. 9B illustrates an example of a wager module, according to an embodiment.

An example of a wager module will now be explained with reference to FIG. 9. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

This figure displays an example of the wager module and the resulting correlations. FIG. 9A: In this example the data that is filtered by the situational data and finding the various correlations with the number of wagers and the various parameters such as the profit and/or loss for a pass wager, for a run wager, etc. An example of non-correlated parameters with the situational data and the number of wagers and the profit and/or loss of the wager with a 15% (which is below the 90% threshold), therefore there is no correlation and no data should be extracted from the historic bet database and stored in the wager adjustment database. FIG. 9B displays an example of the correlations run in the wager module. In this example the data that is filtered by the situational data from the bet database and finding the various correlations with the number of wagers and the various patient parameters such as the total amount wagered for pass wager, the total amount wagered for run wager, etc. The highest correlated parameter with the number of wagers is the total amount wagered for a pass wager with a 95% (which is above the 90% threshold). Then the most re-occurring data point which is 200 wagers and $7,500 total amount wagered is extracted and stored in the wager adjustment database along with the wager ID from the bet database and this is compared to the threshold database which determines if any of these two data points are above a predetermined threshold to adjust the odds in the bet database, element 900.

In still further embodiments, a notification may be provided on a gaming device when it is determined, through an analysis of player behavior, through an analysis of historical wagering data, and/or a current situation on which a wager can placed are at or above a threshold level. For example, a wager module 122 which uses the situational data from the historic bet database 126 on previous wagers with the same situational data and performs correlations on the similar wagers in order to determine if there is a correlation from the historic data in order to extract and store the most re-occurring data point in order to update the odds in the bet database, may also result in a notification that is displayed on the gaming device indicating that a wager of interest may be available to the user or a notification that is pushed to a user which can prompt the user to view a wager of interest if the user is viewing something other than the wager of interest on the gaming device at that time.

In an embodiment, a notification or display module may be initiated when or after the wager adjustment module being initiated by the base module, at step 400. The wager adjustment module compares the wager adjustment database to the threshold database, at step 402. It is determined if there is a match, for example the wager adjustment module has the most re-occurring data point which is 200 wagers and $7,500 wagered which when compared to the threshold results in the odds being decreased by 5%, at step 404. If there is a match then the corresponding wager adjustment from the threshold database, for example a 5% decrease, is extracted, at step 406. The wager ID from the wager adjustment module is also extracted in order to assist in adjusting the odds in the bet database, at step 408. The extracted wager ID is matched with the corresponding wager ID in the bet database, at step 410. The odds in the bet database are adjusted by the extracted wager adjustment, for example the 5% decrease from the threshold database. If the odds in the bet database are −105 and the wager adjustment is a 5% decrease then the odds in the bet database are adjusted and the new odds are −110, at step 412. Following this, a notification may be provided or pushed to the user of the gaming device indicating that a wager of interest is available. Further, the notification may include the adjusted odds and/or an indication that the odds have been further adjusted to better suit that user. In some other embodiments, it may be appreciated that notifications may be displayed, provided to, or pushed to any number of users in a cohort, where the cohort may be based on historical wagering activity, voluntary grouping by users, geographic locations, user preferences, or the like. In still other embodiments, the notifications may be provided or pushed based on some known user data, such as geographic location data of a user (such as location at a stadium or casino or sports book), user preferences, and so forth.

In still further embodiments, an analysis of historical user behavior, user data, and betting history may be utilized to provide further targeted content, actions, and feedback to users. In different embodiments, user rewards may be displayed or pushed to a user based on an analysis of their behavior and betting history, along with a relation to an event, either past, live, or upcoming. For example, if a user has successfully wagered on a specific team to score a certain amounts of points in a game historically, and a threshold for the team scoring that many points has been met in a game in which the user has not placed a wager, a reward or incentive may be provided to the user and ultimately displayed that incentivizes the user to make a wager in the future, for example using adjusted odds as shown above. Further, the system can also determine an appropriate reward that may be utilized to incentivize a user. For example, if the user has typically placed a wager or wagers on action having at least +150 odds, but the odds of a current wager which is also correlated to the user's wagering history and behavior are currently only +130, then the system can determine that boosting the odds on the current wager to +160 and notifying the user or presenting them to the user may cause or incentivize the user to place a wager. In another embodiment, the user historical data and user behavior may determine that if the user is presented with a "free wager" award of $100 where the user can place wagers risk free for that amount, the user will typically place at least $150 in total wagers. In such situations, the system may provide the user with that reward. In still further embodiments, the system may evaluate the user's wager history and behavior and determine that a user acts differently when presented with an "odds boost" incentive versus a "free wager" award. In such scenarios, the system can perform appropriate analysis and compare the various incentives to the currently available wagering action and then provide the incentive that is most likely to result in desired wagering action from the user. Further, it may be appreciated that for this, or any other embodiment described herein, the analysis and customization of odds, notifications, experiences, etc., may be for a single user, a group of users, and/or a cohort of users with similar behaviors or betting histories.

In another embodiment, if a user is showing elements of risky behavior or behavior that could otherwise be considered as detrimental to the user or even fraudulent against the user, using the system may use the betting history and correlations shown above to provide a warning or notification to a user, or otherwise stop or prevent wagering activity until a future time or until a future condition is met. For example, if a user is making wagers with increasingly long odds and/or larger sums of money, and the user is losing each wager (i.e. "chasing losses"), the system may use the modules described herein to determine that it is risky, detrimental, or even fraudulent wagering activity and either provide a notification or take an action to prevent wagering, such as locking the account of the user and providing some other notification to the user. In other embodiments, improper behavior or evidence of cheating, impermissible behavior or sport fixing, including having a bot running an account, may also trigger the wagering system to take some form of action to suspend wagering and/or lock an account. Examples of this can include winning a statistically improbable or impossible number of consecutive wagers, placing a number of wagers that is without basis compared to a user's wagering history, placing one or more wagers which are statistical or monetary outliers compared to a user's wagering history, and/or winning a statistically improbable or impossible wager, such as parlay with statistically impossible odds or a number of legs beyond a threshold amount. In another embodiment, the system may recognize erroneous behavior or an action that is outside of the known history or behavior of a user. For example, if a user has always wagered sums of money between $10 to $1000, and the system receives an input of a wager for $1000 (or $10,000, etc.), the system may recognize that this is not characteristic user behavior and take any action described herein, such as providing a notification of the unusual wager amount, preventing the wager from taking place, or requesting verification of the wagered amount.

In still other embodiments, the same historical data and correlations of data with respect to the historical data and any ongoing action can be utilized to provide information to the user. For example, if a user has made one or more wagers on a team in the past and there is breaking news about a player on that team which, for example, could affect the team's likelihood of winning, that information could be determined to trigger a notification to the user. The notification can include the news information, as well as a reward, incentive, or adjusted odds based on the circumstances.

Further, in some situations, such as where the user is actively using a wagering system or logging into a system after such a determination of news of interest to the user is made (or any other circumstance), the wagering system interface or a user experience with respect to the wagering system can be altered. In one example, wagers that are related to the news (or related to any other determined action of interest of the user from any other embodiment) may be highlighted, presented on a landing screen, or otherwise targeted to the user. Still further, the logo of a team of interest or league of interest may be presented, for example, as the background for a user interface of a wagering system based on any determinations or correlations performed herein. Other embodiments can include autofilling of wagers (including filling in the wagering amounts, teams, players, etc.) where it is determined that a user often makes a wager or based on circumstances where it is determined that a user is likely to wager or should be incentivized to wager. Further, any of the notifications or other user-targeted information herein can include statistics, including, but not limited to, wager likelihood of success statistics, team or player statistics for a particular scenario, user historical wagering success statistics, or any other statistics that can be utilized to promote or incentivize wagering by the user.

In still other exemplary embodiments, user behavior and historical wagering data, along with comparisons and correlations to past, ongoing, or upcoming sports actions or events, can be used to trigger the generation and, in some embodiments, display or presentation of various wagers, such as parlays. For example, the wagering system described herein could analyze a user's past behavior (both wagering activity and activity in the wagering system, such as viewing certain team or player data) and create a wager that, based on the user-specific analysis, is determined to be desirable to the user. For example, if the user has been known to wager on or view certain college basketball teams, and the user likes to bet on games when those certain college basketball teams are significant favorites (for example −250 favorites), the wagering system may create and present and/or display to the user a four game parlay where each game involves one of the certain college basketball teams that the user prefers, and each of those teams is at least a −250 favorite. Such a wager, when presented to the user, may be then interpreted as desirable and may encourage wagering activity from the user. Further, in these embodiments, the dollar amount wagered can also be autofilled. In still another example, the system can analyze a wagering history and user behavior to determine any of the type of wager, wager amount, desired wager winnings, or any combination thereof and provide that to a user or present it on a wagering interface. For example, if a user's history shows that they often place wagers of $2 on parlays that have a return of $10,000 or more, then such a wager could be automatically generated and presented to the user. Further, such a wager may be customized to the user, such as including known sports, leagues, teams, players, and/or in-game actions that the user has been known to place wagers on. In still further embodiments, it is understood that instead of a parlay, the offered and autofilled wager may include both the wager amount itself as well as the monetary amount to be wagered. Further, in some embodiments, the potential winnings, calculated based on the odds and the autofilled monetary amount of the wager, may be shown or otherwise presented to the user, either on the user interface or by way of a displayed or pushed notification.

In another exemplary embodiment, the system may use analysis of one or more users to connect various users in a wagering exchange, for example two users on either side of a proposed wager. In an example, a parlay wager may include two football games with a total of more than 100 points scored. There may be a first user who wants to place a wager on the parlay that more than 100 points will be scored and there may be a second user whose wagering history and/or behavior shows that the second user likes to place wagers on parlays resulting in an under, or, in this example, that fewer than 100 points would be scored in the two football games. Then, in this embodiment, the analysis of historical behavior of the second user can be used to present the second user, via notification or display of a highlighted wager or the like, with the open parlay wager. The second user, upon placing the under wager on the parlay is then mated, via the wagering exchange, with the first user who has placed a wager on the parlay being an over (scoring more than 100 points in the two games). In such an embodiment, the wagering exchange may then facilitate the wager between the first user and the second user, but the second user may have the available wager presented, displayed, or pushed to them based on their historical behavior. In still further exemplary embodiments, a wagering exchange may utilize the embodiments described herein to automatically generate a wager and then present, display, or push the wager to any number of users, for example two users or cohorts, who are known, via their wagering history, to make opposite wagers based on the wagering scenario. For example, the system may generate a two game parlay wager where the over/under is 100 total points scored in the two games. The system may then perform the above analysis send a first notification to a first group of users who are known to make over wagers on such a parlay and a second notification to a second group of users who are known to make under wagers on such a parlay. Further, the system, when generating the wager, may customize the wager to better incentivize individual users or users in a cohort. Such customization can include adjusting the odds of the wager, providing an incentive or reward, utilizing certain sports/leagues/teams/players/etc. in the wager, and the like.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

The invention claimed is:

1. A wagering system, comprising:
   at least one processor; and
   at least one memory having instructions stored thereon which, when executed by the at least one processor, direct the at least one processor to:
   filter a historic database to match a current wager available on a gaming device,
   select a common parameter within historic data in the historic database,
   perform correlations for the selected parameter against other parameters within the historic database,
   determine if there is correlated data and the correlated data exceeds a first threshold, analyze player behavior, and
   and provide a customized output on the gaming device related to the current wager available.

2. The wagering system of claim 1, wherein the processor is further directed to display information regarding the current wager on the gaming device when the correlated data that exceeds the first threshold and the player is viewing content other than the current wager on the gaming device.

3. The wagering system of claim 1, wherein the customized output is adjusted odds for the user.

4. The wagering system of claim 1, wherein the customized output is news related to the current wager.

5. The wagering system of claim 1, wherein the customized output is an autofilled wager.

6. The wagering system of claim 1, wherein the customized output is a wagering incentive or reward.

7. The wagering system of claim 1, further comprising detecting unusual activity and performing one of sending a notification regarding the activity, preventing a wager from being placed, and locking a user account associated with the gaming device.

8. The wagering system of claim 1, wherein the player behavior analyzed is what type of wagers a player places, including one or more of wager type, wager amount, wager frequency, wager win percentage, and teams or players wagered on.

9. The wagering system of claim 1, wherein the processor is further configured to: determine a geographic location of a player,
   wherein the player behavior analyzed is one or more geographic locations the player places wagers from.

10. The wagering system of claim 1, further comprising initiating a customized output following the completion of a play in a sporting event.

11. The wagering system of claim 1, further comprising a wager exchange that facilitates a connection between users on opposite sides of a wager.

12. The wagering system of claim 1, wherein the customized output is a modified user interface.

13. The wagering system of claim 12, wherein the modified user interface includes a logo of at least one of a team or a league.

14. The wagering system of claim 1, wherein the customized output is a presented wager.

* * * * *